United States Patent [19]
Itrich

[11] 3,935,428
[45] Jan. 27, 1976

[54] REPLACEABLE PASSENGER TABULATING AND RECORDING CARD READER UNIT

[75] Inventor: Earl R. Itrich, Tucson, Ariz.

[73] Assignee: Earl R. Itrich, Tucson, Ariz.

[22] Filed: Sept. 4, 1974

[21] Appl. No.: 502,927

[52] U.S. Cl............... 235/61.11 R; 194/4; 248/158
[51] Int. Cl.²... F16M 13/02; G06K 7/08; G07F 9/06
[58] Field of Search ....... 200/46; 194/4 E, 4 F, 4 G; 340/149 A; 248/401, 158; 235/61.11 R, 61.11 D, 61.11 E, 61.12 R, 61.7 B, 92 PD, 92 CE, 61.1

[56] References Cited
UNITED STATES PATENTS

| | | | |
|---|---|---|---|
| 2,584,283 | 2/1952 | Oliver | 248/158 |
| 2,783,865 | 3/1957 | Cleave | 194/4 |
| 3,015,087 | 12/1961 | O'Gorman | 340/149 A |
| 3,268,193 | 8/1966 | Oliveau | 248/158 |
| 3,436,530 | 1/1969 | Faude | 235/92 PD |
| 3,639,730 | 1/1972 | Higginbotham | 235/61.11 E |
| 3,644,711 | 2/1972 | Haller | 235/61.1 |
| 3,686,630 | 8/1972 | Zubay | 340/149 A |
| 3,777,306 | 2/1973 | Speickhoff | 200/46 |
| 3,836,753 | 9/1974 | Pass | 235/61.11 D |

*Primary Examiner*—Daryl W. Cook
*Assistant Examiner*—Robert M. Kilgore
*Attorney, Agent, or Firm*—Cahill, Sutton & Thomas

[57] ABSTRACT

A card reader system particularly adapted for use by public transportation vehicles and including detachable mounting means and featuring easily replaceable functionally discrete components to eliminate downtime of the vehicle due to malfunctions within the card reader system is disclosed.

6 Claims, 10 Drawing Figures

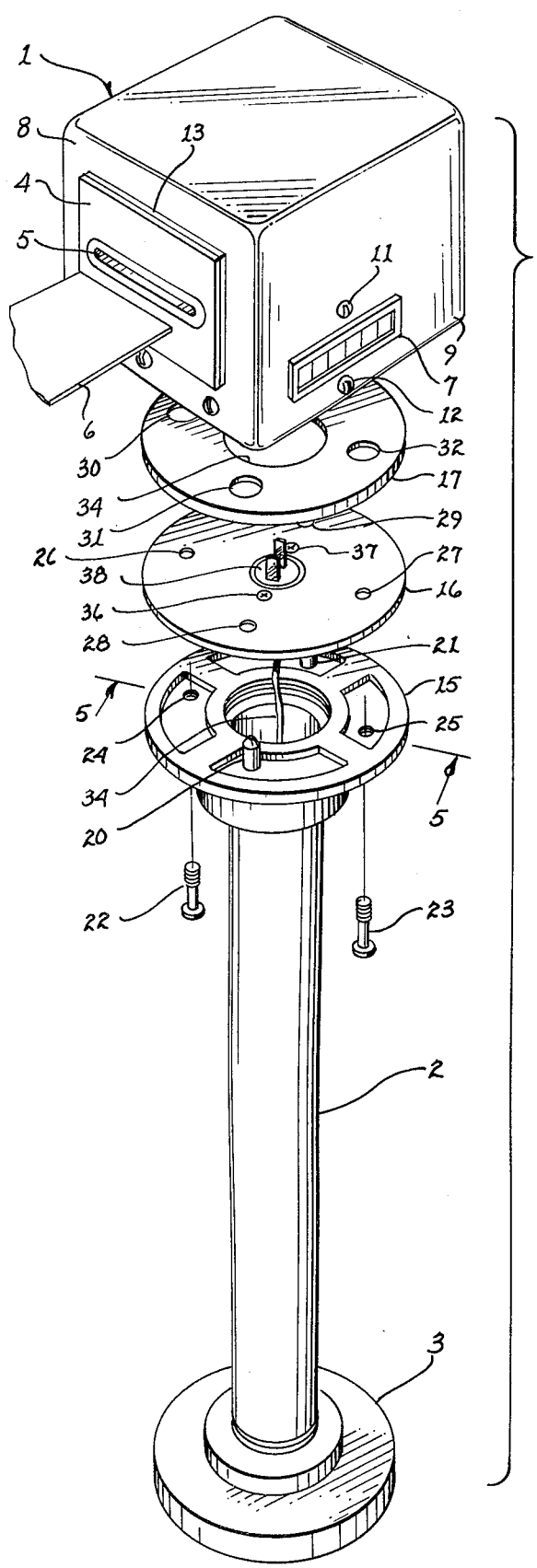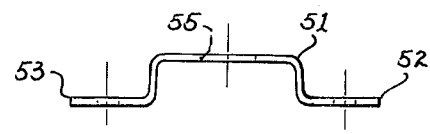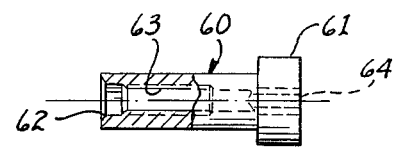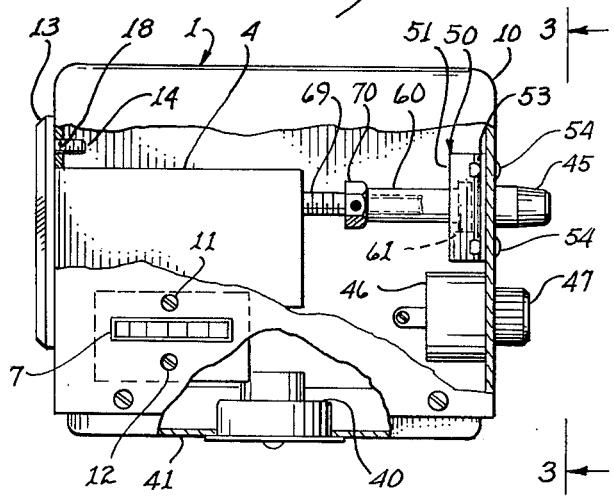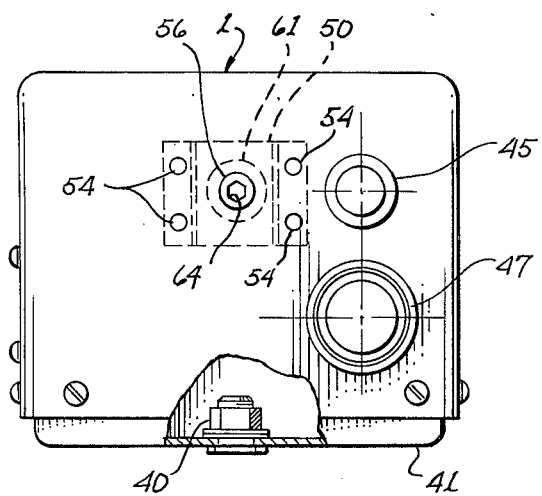

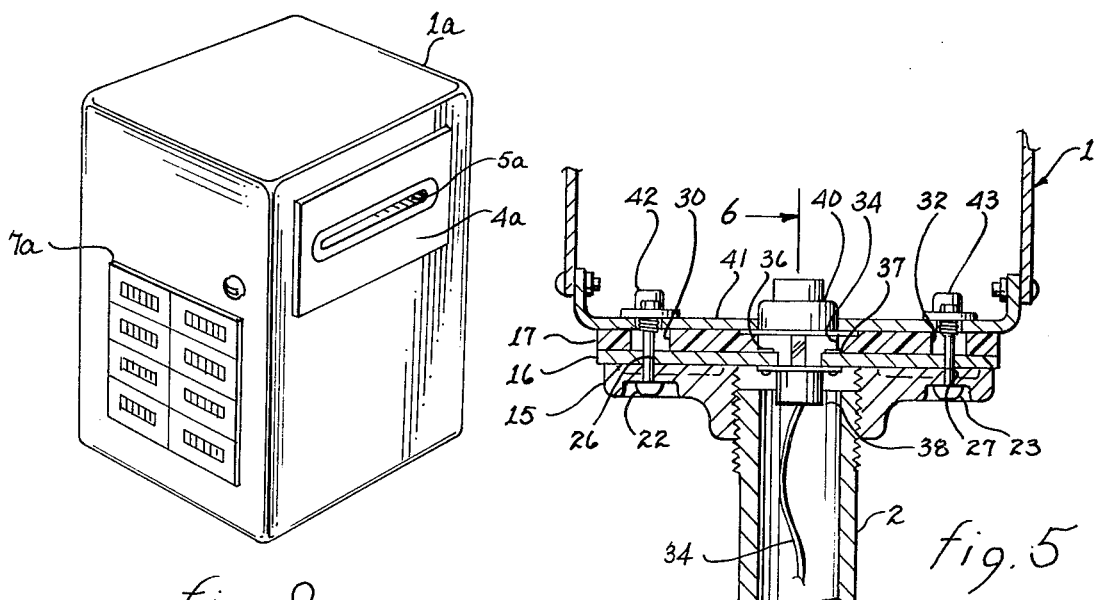

REPLACEABLE PASSENGER TABULATING AND RECORDING CARD READER UNIT

The present invention relates to tabulating and recording systems and, more particularly, to systems for tabulating and recording the number and category of passengers utilizing a public transportation vehicle.

In recent years, the urban sprawl characteristic of every major city in the country, the increasingly complex road system and the increasing number of private vehicles have rendered public transportation systems economic liabilities. Hence, many municipalities have eliminated or substantially curtailed their support of extensive intracity bus or rail systems. Consequently, many persons who depend upon a public transportation system to convey them to and from work, shopping and entertainment centers have been economically and socially disenfranchised.

The relatively recent revitalization of downtown metropolitan areas, coupled with the state and Federal pleas for limiting usage of the personal automobile, has given new impetus to existing public transportation systems. Further, many municipalities have come to recognize that a public transportation system cannot be reasonably expected to show a profit while providing adequate facilities and satisfying the scheduling needs of the populace. Hence, subsidization, whether state and/or Federal, of public transportation systems are becoming the norm, rather than the exception.

With the acceptance of a subsidized public transportation system, communities have also recognized that certain classes of persons, namely the elderly, the young and the handicapped can be rightfully and legitimately given special consideration due to their generally impecunious financial situation. Pursuant thereto, many municipalities issue passes to these persons at no cost or at a modest cost.

When a pass is presented, the driver must visually verify the accuracy and correctness of the pass. This function distracts the driver from his primary purpose of operating the vehicle and causes delays and inconvenience during boarding of the bus. For record keeping purposes, and particularly where Federal subsidization is obtained and, is based upon the usage thereof by special category older persons, the physically imfirm, or the young, the driver must keep accurate records of such passengers. This chore is extremely time consuming and detracts from the efficient operation of the vehicle.

It is therefore a primary object of the present invention to provide an apparatus which accurately records and tabulates the type and number of pass carrying passengers utilizing public transportation systems.

Another object of the present invention is to provide a means for eliminating the need for the driver to personally verify the viability of a bus pass.

Still another object of the present invention is to increase the efficiency of tabulating the fare in public transportation systems.

Yet another object of the present invention is to eliminate the downtime of a public transportation vehicle due to malfunction of the passenger recording and tabulation unit.

A further object of the present invention is to provide rapidly replaceable malfunctioning passenger recording and tabulating units.

A still further object of the present invention is to provide a means for making in field replacement of one or more components of a passenger recording and tabulating unit.

A yet further object of the present invention is to provide an efficient passenger recording and tabulation unit.

These and other objects of the present invention will become apparent to those skilled in the art as the description thereof proceeds.

The present invention may be described with greater specificity and clarity with reference to the following drawings, in which:

FIG. 1 illustrates an exploded view of the present invention.

FIG. 2 illustrates a partial cut away side view of the present invention.

FIG. 3 illustrates a partial rear view of the present invention.

FIGS. 4a and 4b illustrate elements embodied within the present invention.

FIG. 5 illustrates a cross-sectional view taken along lines 5—5, as shown in FIG. 1.

FIG. 6 illustrates a cross-sectional view taken along lines 6—6, as shown in FIG. 5.

FIG. 7 is a representation of the function of the present invention.

FIG. 8 is an electrical schematic diagram of the operation of the Energization invention.

FIG. 9 illustrates a variant of the present invention.

Referring to FIG. 1, there is shown a card reader unit responsive to magnetically encoded pass cards. The card reader unit, upon insertion of a pass card therein decodes the magnetically encoded information and provides a visual output at one or more counters. These counters not only tabulate the number of passengers but also discriminate between passengers of different categories and can cumulatively record the information. The card reader unit also has the capability of determining whether or not a pass card has expired, whether the pass card contains a certain predetermined minimum amount of information, or perform other checks. A failure of the pass card to satisfy the predetermined criteria is noted by the card reader unit by failing to generate an audible tone. Thus, the card reader unit provides an immediate check on the correctness and viability of the inserted pass card.

The card reader unit is self contained, except for a source of electrical power, and is enclosed within a housing 1. If the card reader unit is used within a bus, as intended by the preferred embodiment, the housing 1 is mounted upon a post 2 extending from a pedestal 3 located on the floor of the vehicle. A card reader 4 is mounted upon side 8 of housing 1 and includes a slot 5 for receiving a card 6. One or more counters 7 are mounted in side 9 to cumulatively record any predetermined encoded information presented by card 6.

It is well known that any mechanical or electrical machine will malfunction at one time or another. Where, as with the present invention, a malfunction can cause unwanted and irritating delays for the passengers of a public transportation vehicle, the malfunction is best cured by quickly replacing the malfunctioning unit. Referring jointly to FIGS. 1, 5 and 6, the support means for detachably mounting housing 1 upon post 2 will be described.

A flange 15 is threadedly secured to the upper extremity of post 2 and serves as the primary supporting surface for the attached housing. A removable disc 16 is located adjacent the upper surface of the flange. A male connector 38 is mounted within a centrally disposed aperture in disc 16 and secured thereto by screws engaging press nuts 36 and 37. The male connector provides electrical power to the card reader unit. An electrical conduit 34 extends downwardly from male connector 38 through post 2 and flange 3 to a supply of electrical power within the vehicle. A circular pad 17 is placed intermediate disc 16 and base 41 of housing 1 to protect the card reader unit against shock and vibration.

Guide means, such as a pair of guide pins 20 and 21, extend upwardly from flange 15 through mating apertures 28 and 29 in disc 16, through apertures 31 and 33 in pad 17 and mate with bushings 48 and 49 attached to base 41. Thereby, guide pins 20 and 21 retain the mounting elements and housing 1 in alignment with one another. Housing 1 is drawn toward flange 15 by attachment means, such as a pair of captive screws 22 and 23. The captive screws 22 and 23 extend through the respective ones of apertures 26 and 27 in disc 16, apertures 30 and 32 in pad 17 and threadedly engage anchor nuts 42 and 43, mounted on the interior surface of base 41. A female connector 40 is centrally mounted within base 41 to mate with male connector 38.

From the above description it becomes readily apparent that housing 1 can be easily and rapidly replaced by simply unthreading captive screws 22 and 23 and lifting housing 1. The upward movement of housing 1 will automatically disconnect the electrical connectors 38 and 40. Thus, both the mechanical and electrical disconnection of the card reader unit is rapidly performed. A replacement card reader unit may be similarly rapidly attached by aligning the card reader unit such that bushings 48 and 49 mate with guides 20 and 21 and pushing housing 1 downwardly. The downward movement of the housing will automatically electrically connect male and female connectors 38 and 40. Simultaneously, the captive screws 22 and 23 will be aligned with their respective anchor nuts and the screws can be tightened without further alignment measures. As will be appreciated by those skilled in the art, replacement of a defective card reader unit can be accomplished in less than a minute.

To facilitate repair of the card reader unit by low grade technicians, each of the functionally distinct units have been configured as segregable and replaceable components. In the following description of the removability of the individual components, reference will be made primarily to FIGS. 2, 3, 4a and 4b. In example, counter 7 is detachable from side 9 of housing 1 unscrewing screws 11 and 12. These screws extend through appropriately sized holes within side 9 and engage threaded apertures within the counter itself. The counter is wired to card reader 4 through a disconnectable plug (not shown) such that electrical disconnection can be made with ease.

The below described disconnect means retains the card reader 4 within housing 1. A retainer 50, having a U-shaped channel 51 and a pair of laterally extending flanges 52 and 53 is affixed to the inner surface of side 10 of housing 1 by a plurality of rivets 54. A support 60 is rotatably mounted within aperture 55 of channel 51 and retained therein by annular flange 61. A longitudinally oriented cavity 62, which cavity is at least partially internally threaded, is disposed within the shaft of support 60. Engagement means, such as a hexagonal receptacle 64, oriented about the longitudinal axis of support 60, is disposed within the flanged end of the support. When the support is mounted within retainer 50, as shown in FIGS. 2 and 3, receptacle 64 is essentially coincident with an aperture 56 in side 10 to provide access to the receptacle within an Allen wrench.

Card reader 4 is inserted within housing 1 through an aperture in side 8 until face plate 13 is adjacent the side. During insertion, aligning studs 14, extending inwardly from face plate 13, mate with corresponding key ways 18 within side 8 to vertically and laterally position the card reader. A threaded stud 69 extends rearwardly from card reader 4 and a locking nut 70 may be threadedly mounted thereon. Stud 69 is in general alignment with threads 63 of cavity 62 in support 60 whereby clockwise rotation of the support by means of an Allen wrench will draw the stud into cavity 62 and secure the card reader in place.

The above discussed tone generator 46 is mounted internal to housing 1 on side 10. A knob 47 may extend therefrom to permit the driver of the vehicle to vary the volume of the tone commensurate with the ambient noise. A fuse 45 is also mounted upon side 10, which fuse performs the normal function of preventing electrical burn out. The electrical wires interconnecting the card reader, counter, tone generator and fuse are not shown as such connections are highly variable and readily apparent to those skilled in the art. Each of the elements may be interconnected through electrical plugs to simplify individual replacement.

The operation of the present invention will be briefly described with respect to FIG. 7. A passenger having a pass card 6 inserts it through a slot in card reader 4. The card is magnetically encoded to convey certain information such as in identification of the category of the passenger, expiration date, fare structure applicable to the passenger, etc. If the information decoded by the card reader indicates that the passenger is authorized to ride the public transportation vehicle, verification means, or tone generator 46, is activated to provide the driver with an audible affirmation. Simultaneously, one or more counters 7 cumulatively record predetermined segments of the encoded information contained in each card 6.

FIG. 8 illustrates a representative schematic of an electrical circuit useable with the present invention. Power supply 71, usually a part of vehicle itself, provides electrical power to the card reader system through electrical conduits 34. Fuse 45 is inserted in line with electrical conduit 34 and serves to prevent electrical damage in the event of a malfunction, in the usual manner. On insertion of a pass card 6 within the card reader 4, the magnetically encoded information will cause one or more of switches 73 and switch 74 within bank of switches 72 to close. Each closed switch 73 will cause electrical current to flow through and energize the respective one of coils 75 in counter 7. energization of one of coils 75 will provide a commensurate output within the associated counter. Switch 74 is actuated each time any pass card 6 is inserted within card reader 4 whereby the respective coil 76 is energized to provide a commensurate count within counter 7. Thereby, switch 74 records the total number of pass cards employed without distinction as to category of the user. Closing of switch 74 also provides a flow of current through tone generator 46 each time a pass card 6 is inserted within the card reader. It is to be appreciated that additional circuitry may be employed whereby certain combination of switches must be closed in order to provide a flow of current through tone generator 46. If more complex circuitry is employed, various additional checks can be automatically performed to verify the currency and validity of the inserted pass card.

FIG. 9 illustrates a variant housing for the present invention wherein a plurality of counters 7a are employed to provide a recorded visual accounting of a plurality of different categories of passengers. Housing 1a includes a card reader 4a having a card input slot 5a similar to that described above.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. An easily replaceable electrically powered pass card operated card reader unit having replaceable components, said card reader unit being mountable within a public transportation vehicle for tabulating and recording information presented by the pass cards, said card reader unit comprising:
   a. a multi apertured housing;
   b. support means for detachably mounting said housing, said support means including guide means for attachably positioning said housing onto said support means and attachment means for retaining said housing in place;
   c. a card reader located within an aperture at the front of said housing;
   d. disconnect means for detachably mounting said card reader within the front aperture of said housing to permit in situ replacement of said card reader, said disconnect means being internal to said housing and operable through another aperture of said housing;
   e. a removable counter located within a further aperture in said housing for providing a visible count of the pass cards inserted within said card reader; and
   f. verification means for verifying the viability of the pass cards.

2. The unit as set forth in claim 1 wherein said disconnect means comprises:
   a. a threaded stud extending rearwardly of said card reader;
   b. a support having a threaded cavity disposed within one end for engaging said stud;
   c. a retainer extending inwardly from the side of said housing for rotatably retaining another end of said support; and
   d. engagement means accessible through the other aperture of said housing for receiving a tool to rotate said support into and out of engagement with said stud; whereby said card reader can be drawn to firmly mount said card reader within said housing.

3. The unit as set forth in claim 2 wherein said support comprises:
   a. a cylindrical shaft, said threaded cavity being in alignment with the longitudinal axis of said shaft; and
   b. an annular flange extending from said other end of said support and engaging said retainer.

4. The unit as set forth in claim 3 wherein said retainer comprises:
   a. a U-shaped channel, said channel having a base of a width sufficient to receive said annular flange;
   b. an opening disposed within the base of said channel for receiving said shaft; and
   c. a pair of laterally extending flanges, said flanges being secured to the inside surface of the side of said housing.

5. The unit as set forth in claim 4 wherein said engagement means comprises a hexagonal receptacle.

6. The unit as set forth in claim 5 wherein said support means comprises:
   a. a flange;
   b. a disc disposed adjacent said flange for supporting an electrical connector;
   c. a pad juxtaposed with said disc to provide a resilient seat for said housing, said guide means extending from said flange through said disc and said pad for mating with said housing; and
   d. a pair of captive screws retained by said flange and extending through said disc and said pad into said housing for drawing said housing toward said flange.

* * * * *